United States Patent
Abuelsaad et al.

(10) Patent No.: US 8,605,882 B1
(45) Date of Patent: Dec. 10, 2013

(54) ADDING A TELECONFERENCE CALLER TO A GROUP INSTANT MESSAGING CHAT

(75) Inventors: Kelly Abuelsaad, Poughkeepsie, NY (US); Kulvir S. Bhogal, Fort Worth, TX (US); Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/474,951

(22) Filed: May 18, 2012

(51) Int. Cl.
*H04M 3/42* (2006.01)

(52) U.S. Cl.
USPC ............... 379/202.01; 370/260; 709/204

(58) Field of Classification Search
USPC ............... 379/202.01; 370/260; 709/204
See application file for complete search history.

(56) References Cited

U.S. PATENT DOCUMENTS

| | | | |
|---|---|---|---|
| 6,628,767 B1 | 9/2003 | Wellner et al. | |
| 7,450,705 B1 | 11/2008 | Cohen | |
| 7,603,412 B2* | 10/2009 | Beyda | 709/204 |
| 7,739,340 B2 | 6/2010 | Arenburg et al. | |
| 2003/0126207 A1* | 7/2003 | Creamer et al. | 709/204 |
| 2006/0031234 A1 | 2/2006 | Beartusk et al. | |
| 2008/0088428 A1* | 4/2008 | Pitre et al. | 340/506 |
| 2009/0006555 A1* | 1/2009 | Curran et al. | 709/206 |
| 2010/0080375 A1 | 4/2010 | Michaelis et al. | |
| 2013/0007175 A1* | 1/2013 | Travis et al. | 709/206 |
| 2013/0101107 A1* | 4/2013 | DeJana et al. | 379/204.01 |

OTHER PUBLICATIONS

"Group Chat in Yahoo messenger?—Yahoo! Answers," posted Sep. 11, 2008 <http://answers.yahoo.com/question/index?qid=20080911140759AAq3VQO>.

* cited by examiner

*Primary Examiner* — Creighton Smith
(74) *Attorney, Agent, or Firm* — Nicholas L. Cadmus; Mark Vallone (57) ABSTRACT

In a method for adding a caller to a group instant messaging chat, a computer receives an indication that the caller has joined a teleconference via a telephone call. The computer receives a characteristic of the telephone call. The computer determines that the received characteristic of the telephone call at least partially matches at least one stored characteristic of one or more invitees on a list of invitees to the teleconference. In response to determining that the received characteristic of the telephone call at least partially matches at least one stored characteristic of one or more invitees on a list of invitees to the teleconference, the computer requests an instant messaging server to add the caller to the group instant messaging chat.

20 Claims, 5 Drawing Sheets

FIG. 5

ADDING A TELECONFERENCE CALLER TO A GROUP INSTANT MESSAGING CHAT

TECHNICAL FIELD

The present invention relates generally to a method, system, and computer program product for managing group instant messaging chats, and more specifically to a method, system, and computer program product for adding a caller joined to a teleconference to a group instant messaging chat.

BACKGROUND

Teleconferencing is a form of audio voice communication over a network. The network may be a local area network (LAN), a wide area network (WAN) such as the Internet, the public switched telephone network (PSTN), or any combination thereof. Typically, a teleconferencing service allocates one or more participant codes to invitees to a teleconference and connects each invitee to the teleconference based on the participant code entered by the invitee after he or she has dialed the call in number of the teleconference service.

A teleconference usually includes a host, who organizes or leads the conference, and a number of other invitees, also called guests. The host may often have additional privileges beyond those of the guests, such as, for example, being able to add or remove guests from the conference. The host may be distinguished from the guests by having a participant code that is different from the participant codes assigned to the guests.

Instant messaging (IM) is a form of communication over the Internet or other networks. IM allows for real time communication between two or more users. This communication is often text based but may include file sharing or other types of communication. Typically, users log in to IM servers using IM client programs that are located on client computing devices. These client computing devices range from desktop personal computers to smart phones. Each user who logs in to an IM server does so using a unique instant messaging ID that has been created to identify that particular user. IM client programs may be dedicated client instant messaging programs or functions integrated within other programs such as IBM® Lotus Notes®.

Calendaring functions are typically provided by electronic calendaring and/or email applications. Calendaring functions allow for the scheduling of teleconferences with one or more invitees and issuing the invitations for such teleconferences to the invitees. A calendaring function enables the host setting up the teleconference to inform the invitees of the teleconference's topic, date, and time. Also, the use of the calendaring function enables the invitees to provide an electronic response (RSVP) to the invitations.

The invitees are typically identified by an email or other electronic address (e.g., internet protocol (IP) address or computer machine (MAC) address) and provide an electronic response from that address. The invitees typically provide a response (RSVP) message indicating the invitee's intention or ability to attend or not attend the teleconference. Calendaring functions may prompt an invitee to respond with an acceptance or rejection and then automatically return the response to the host or a meeting facilitator.

SUMMARY

A first aspect of the present invention provides a method for adding a caller to a group instant messaging chat. The method includes a computer receiving an indication that the caller has joined a teleconference via a telephone call. The method further includes the computer receiving a characteristic of the telephone call. The method further includes the computer determining that the received characteristic of the telephone call at least partially matches at least one stored characteristic of one or more invitees on a list of invitees to the teleconference, and in response, the computer requesting an instant messaging server to add the caller to the group instant messaging chat.

A second aspect of the present invention provides a computer program product for adding a caller to a group instant messaging chat. The computer program product includes one or more computer-readable tangible storage devices and program instructions stored on at least one of the one or more storage devices. The program instructions include program instructions to receive an indication that the caller has joined a teleconference via a telephone call. The program instructions include program instructions to receive a characteristic of the telephone call. The program instructions include program instructions to determine that the received characteristic of the telephone call at least partially matches at least one stored characteristic of one or more invitees on a list of invitees to the teleconference, and in response, to request an instant messaging server to add the caller to the group instant messaging chat.

A third aspect of the present invention provides a computer system for adding a caller to a group instant messaging chat. The computer system includes one or more processors, one or more computer-readable memories, one or more computer-readable tangible storage devices and program instructions which are stored on at least one of the one or more storage devices for execution by at least one of the one or more processors via at least one of the one or more memories. The program instructions include program instructions to receive an indication that the caller has joined a teleconference via a telephone call. The program instructions include program instructions to receive a characteristic of the telephone call. The program instructions include program instructions to determine that the received characteristic of the telephone call at least partially matches at least one stored characteristic of one or more invitees on a list of invitees to the teleconference, and in response, to request an instant messaging server to add the caller to the group instant messaging chat.

DETAILED DESCRIPTION

The present invention will now be described in detail with reference to the figures.

Figure 1:
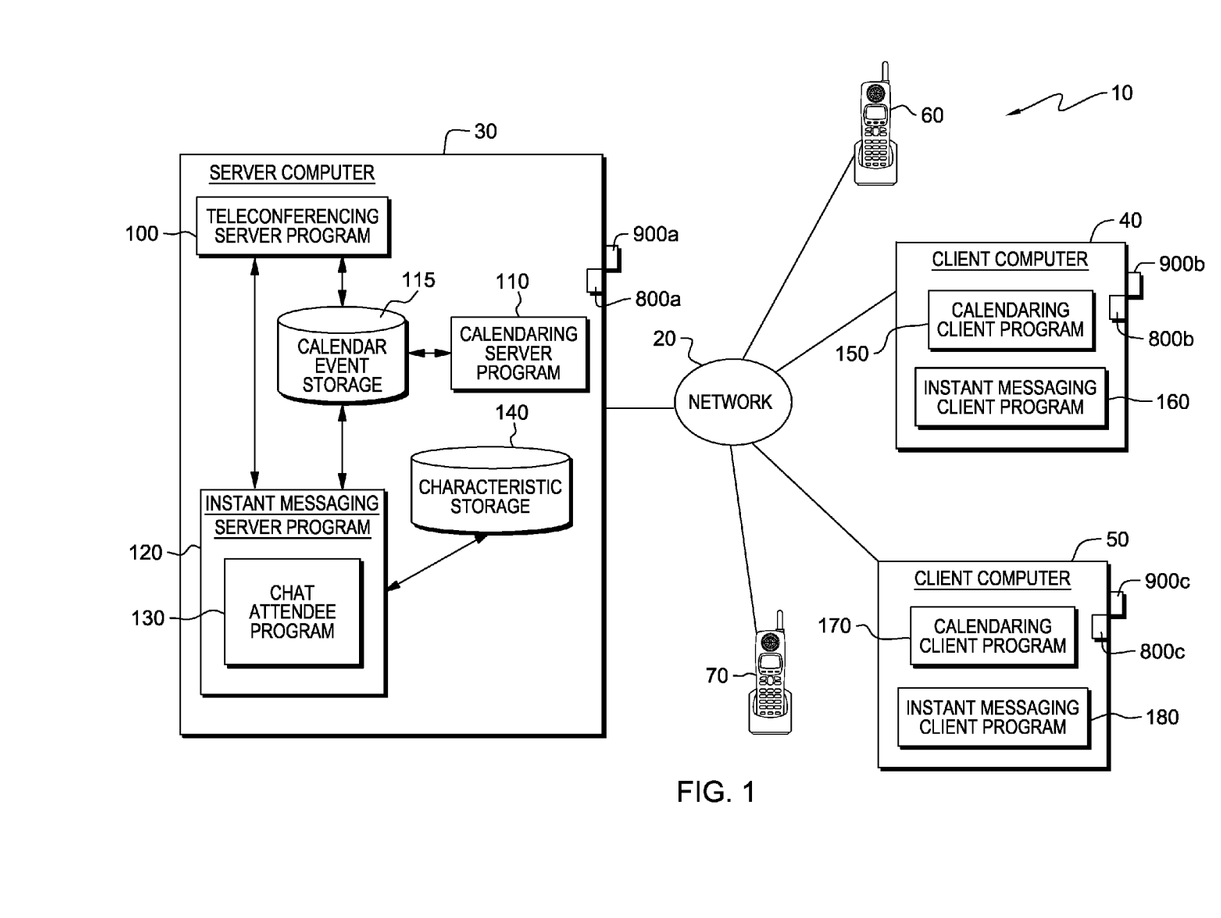
FIG. 1 depicts a diagram of a computing system in accordance with one embodiment of the present invention.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, system 10 includes server computer 30, client computer 40, client computer 50, telephone 60 and telephone 70 interconnected over network 20. Network 20 may be a local area network (LAN), a wide area network (WAN) such as the Internet, the public switched telephone network (PSTN), any combination thereof, or any combination of connections and protocols that will support communications between server computer 30, client computer 40, client computer 50, telephone 60 and telephone 70 in accordance with embodiments of the invention. Network 20 may include wired, wireless, or fiber optic connections. System 10 may include additional server computers, client computers, telephones, or other devices not shown.

Server computer 30 may be a management server, a web server, or any other electronic device or computing system capable of receiving and sending data. In other embodiments, server computer 30 may represent a server computing system utilizing multiple computers as a server system, such as in a cloud computing environment. Server computer 30 contains teleconferencing server program 100, calendaring server program 110, instant messaging server program 120, chat attendee program 130, characteristic storage 140, and calendar event storage 115.

Client computers 40 and 50 may be desktop computers, laptop computers, tablet computers, personal digital assistants (PDA), or smart phones. In general, client computers 40 and 50 may each be any electronic device or computing system capable of sending and receiving data, and communicating with server computer 30 over network 20.

Calendaring client programs 150 and 170 execute on client computers 40 and 50, respectively. Calendaring client programs 150 and 170 may be dedicated client calendaring programs, functions integrated within other programs such as IBM® Lotus Notes®, or any other program or function that can communicate with calendaring server program 110 and provide a user interface for creating, receiving and responding to teleconference invitations.

A teleconference invitation may be created by selecting invitees and a date and time for a teleconference. Invitations may be sent to invitees by an electronic message, such as an email message or an alert to a client calendaring program. Invitees are typically selected from a list of names with corresponding contact information. The list of names may be a contact list created by a user or an employee profile directory created by a business.

Instant messaging client programs 160 and 180 execute on client computers 40 and 50, respectively. Instant messaging client programs 160 and 180 may be dedicated client instant messaging programs, functions integrated within other programs such as IBM® Lotus Notes®, or any programs that can communicate with instant messaging server program 120 and provide a user interface for sending and receiving instant messaging communications.

Telephones 60 and 70 may be plain old telephone service (POTS) telephones, voice over internet protocol (VoIP) telephones, cellular telephones, smart phones, or computers implementing a telephony application. In general, telephones 60 and 70 may each be any device or computing system capable of transmitting voice and caller identification (caller ID) data to server computer 30 over network 20. Calendaring client programs 150 and 170 or instant messaging client programs 160 and 180 may execute on telephones 60 and 70, respectively, if the respective telephone 60 or telephone 70 is a smart phone or any other device capable of executing code, transmitting voice and caller identification (caller ID) data, sending and receiving data, and communicating with server computer 30 over network 20.

Calendaring server program 110 operates to receive, forward, and manage teleconference invitations between client computer 40, client computer 50, and other client computers (not shown). In one embodiment, calendaring server program 110 stores all teleconference invitations that it manages in calendar event storage 115. Along with the stored teleconference invitations, calendaring server program 110 may also store, in calendar event storage 115, information on whether invitees to the teleconference have accepted or rejected the teleconference invitation. In one embodiment, calendaring server program 110 resides on server computer 30. In other embodiments, calendaring server program 110 may reside on another server or another computing device, provided that calendaring server program 110 is accessible to calendaring client programs 150 and 170 and has access to calendar event storage 115.

Calendar event storage 115 may be a repository that may be written and read by calendaring server program 110 and may be accessible to teleconferencing server program 100 and instant messaging server program 120. For example, calendar event storage 115 may be a database such as an Oracle® database or an IBM® DB2® database.

Teleconferencing server program 100 operates to receive voice and caller ID data and to manage teleconference meetings between invitees who call in to a teleconference service. At the scheduled date and time for the meeting, invitees call a teleconference number that may be listed in the teleconference invitation. In one embodiment, telephone communication between telephones 60 and 70 occurs over network 20 when the invitees use telephones 60 and 70 to dial a teleconference number to call the teleconference service and are connected to teleconferencing server program 100. In one embodiment, teleconferencing server program 100 resides on server computer 30. In other embodiments, teleconferencing server program 100 may reside on another server or another computing device, provided that teleconferencing server program 100 is accessible to telephone 60 and telephone 70, and provided that instant messaging server program 120 and has access to calendar event storage 115.

Instant messaging server program 120 operates to receive, forward, and manage instant messaging communications between instant messaging client programs 160 and 180. In one embodiment, instant messaging server program 120 resides on server computer 30. In other embodiments, instant messaging server program 120 may reside on another server or another computing device, provided that instant messaging server program 120 is accessible to instant messaging client programs 160 and 180, and provided that teleconferencing server program 100 and has access to calendar event storage 115 and characteristic storage 140.

Chat attendee program 130 operates to request that instant messaging server program 120 add a caller, who has joined a teleconference via a telephone call, to a group instant messaging chat if the caller is identified as an invitee to the teleconference. Chat attendee program 130 may also request that instant messaging server program 120 remove a caller from a group instant messaging chat if the caller has disconnected from the teleconference. In other embodiments, chat attendee program 130 may add a caller, who has joined a teleconference via a telephone call, to a group instant messaging chat if the caller is identified as an invitee to the teleconference.

In one embodiment, chat attendee program 130 compares a characteristic of a telephone call placed by a caller who has joined a teleconference, to stored characteristics of invitees to the teleconference. Chat attendee program 130 requests that instant messaging server program 120 add the caller to a group instant messaging chat if chat attendee program 130 determines that the characteristic of the telephone call matches a stored characteristic of an invitee to the teleconference. In one embodiment, chat attendee program 130 is a function of instant messaging server program 120 on server computer 30. In other embodiments, chat attendee program 130 may be a separate program that resides on another server or another computing device, provided that chat attendee program 130 is able to access instant messaging client programs 160 and 180 and instant messaging server program 120, and provided that teleconferencing server program 100 and has access to calendar event storage 115 and characteristic storage 140.

In one embodiment, the characteristic of the telephone call may be the telephone number from which the telephone call originated. In another embodiment, the characteristic of the telephone call may be the name of the caller. In other embodiments, the characteristic of the telephone call may be a unique passcode or any other type of data that can be transmitted from a telephone to server computer 30 and that may identify the caller as an invitee to the teleconference. Stored characteristics of invitees to the teleconference are stored in characteristic storage 140.

Characteristic storage 140 contains stored characteristics of possible teleconference invitees. In one embodiment, the stored characteristics can be included in profiles of the possible teleconference invitees; an example profile is discussed in greater detail in reference to FIG. 3. Each profile contains the name of a possible teleconference invitee and certain stored characteristics that will be compared to the characteristic of the telephone call. In one embodiment, in the corporate setting, characteristic storage 140 contains profiles of all the employees of the corporation along with certain characteristics. In one embodiment, characteristic storage 140 is located on server computer 30. In another embodiment, characteristic storage 140 may be located on another server or another computing device, provided that characteristic storage 140 is accessible to chat attendee program 130. In one embodiment, characteristic storage 140 is a repository that may be read by chat attendee program 130. In other embodiments, characteristic storage 140 may be a database such as an Oracle® database or an IBM® DB2® database.

Server computer 30 and client computers 40 and 50, each maintain respective internal components 800a, 800b, and 800c, and respective external components 900a, 900b, and 900c. In general, server computer 30 and client computers 40 and 50 can be any computing system as described in further detail with respect to FIG. 5.

Figure 2:
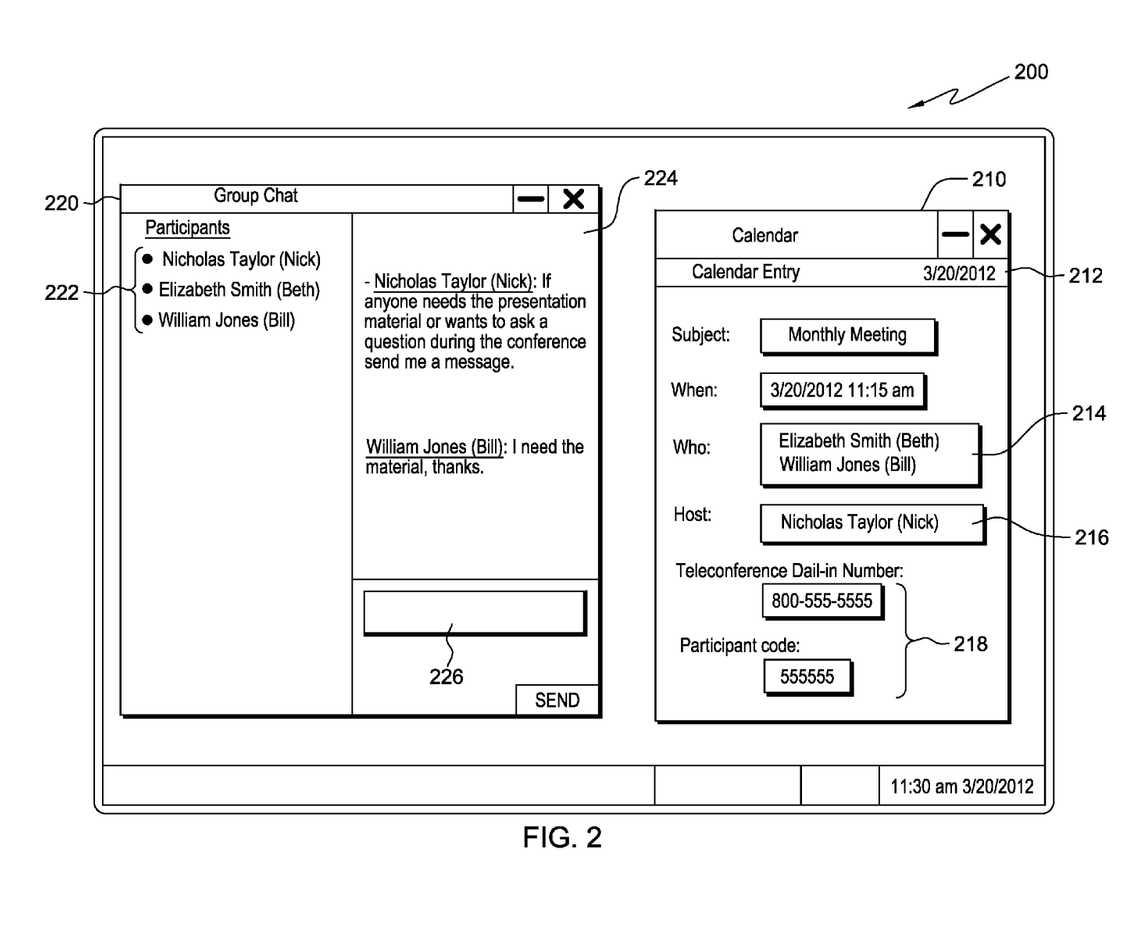
FIG. 2 is an exemplary user interface to a calendaring client program and an instant messaging client program in accordance with one embodiment of the present invention.

FIG. 2 is an exemplary user interface to a calendaring client program and an instant messaging client program in accordance with one embodiment of the present invention. User interface 200 may be a user interface to calendaring client program 150 and instant messaging client program 160 of client computer 40 of FIG. 1. User interface 200 allows a user to create, receive and respond to teleconference invitations, and to send and receive instant messaging communications. In the depicted embodiment, user interface 200 is shown as viewed by an invitee (i.e., William Jones) to a teleconference as the teleconference is taking place.

Calendaring client window 210 of the calendaring client program contains calendar entry 212. Calendar entry 212 is exemplary of a teleconference invitation that has been accepted by an invitee (i.e., William Jones). Calendar entry 212 may contain information about the teleconference such as the subject, date, time, invitees, and information about how to call the teleconference service. Fields 214 and 216 contain the names of invitees to the teleconference. Field 216 contains the name of the invitee who created the teleconference invitation. Field 214 contains the names of other invitees to the teleconference. Fields 218 contain the telephone number for the teleconference service and the participant code for that particular teleconference.

Figure 3:
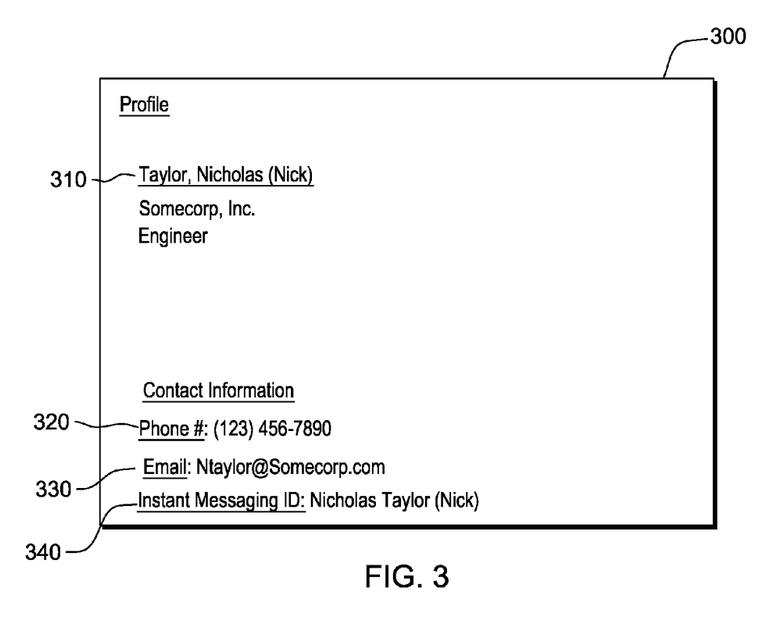
FIG. 3 is an exemplary profile including stored characteristics in accordance with one embodiment of the present invention.

In response to an invitee (i.e., William Jones) connecting to the teleconference service via a telephone call placed on a telephone, such as telephone 60 of FIG. 1, chat attendee program 130 requests that instant messaging server program 120 add the invitee to a group instant messaging chat, displayed in instant messaging client window 220 of the instant messaging client program, if chat attendee program 130 determines that a characteristic of the telephone call matches a stored characteristic in characteristic storage 140 of an invitee to the teleconference. In one embodiment, stored characteristics in characteristic storage 140 may be included in profiles of possible invitees to the teleconference (an example of such a profile is shown in FIG. 3). Instant messaging client window 220 contains participant list 222 which identifies group chat attendees (i.e., by their respective instant messaging ID's) who have been added to the group instant messaging chat. Chat field 224 displays instant messages exchanged between the group chat attendees in participant list 222. Message input field 226 is a field for the invitee using user interface 200 (i.e., William Jones) to input an instant messaging communication he wishes to send to the other attendees in the group chat.

FIG. 3 is an exemplary profile including stored characteristics in accordance with one embodiment of the present invention. In response to a teleconference attendee (Nicholas Taylor in the depicted embodiment) connecting to a teleconference service via a telephone call placed on a telephone, such as telephone 60 of FIG. 1, chat attendee program 130 compares a characteristic of the telephone call to stored characteristics of invitees to the teleconference. The stored characteristics may be stored in characteristic storage 140 of FIG. 1 and may include the characteristics in profile 300 and characteristics stored in other profiles.

Profile 300 contains name 310 (Taylor, Nicholas (Nick)), phone number 320, email address 330, and instant messaging ID 340. Name 310 and phone number 320 are considered characteristics in this example. Phone number 320 may be a work number, a cellular number, or a home number. Profile 300 may contain other stored characteristics that can be compared to data transmitted from a telephone, such as alternate phone numbers and a sample of the invitee's voice speaking the invitee's name. The alternate phone numbers and/or the sample of the invitee's voice speaking the invitee's name could be inputted by the invitee during the creation of profile 300.

A calendaring client program, such as calendaring client program 150 of client computer 40 of FIG. 1, may use email address 330 when a user creates a teleconference invitation. Chat attendee program 130 may use instant messaging ID 340 in requesting instant messaging server program 120 to add an invitee corresponding to instant messaging ID 340 (i.e., Nicholas Taylor) to the group instant messaging chat.

Figure 4:
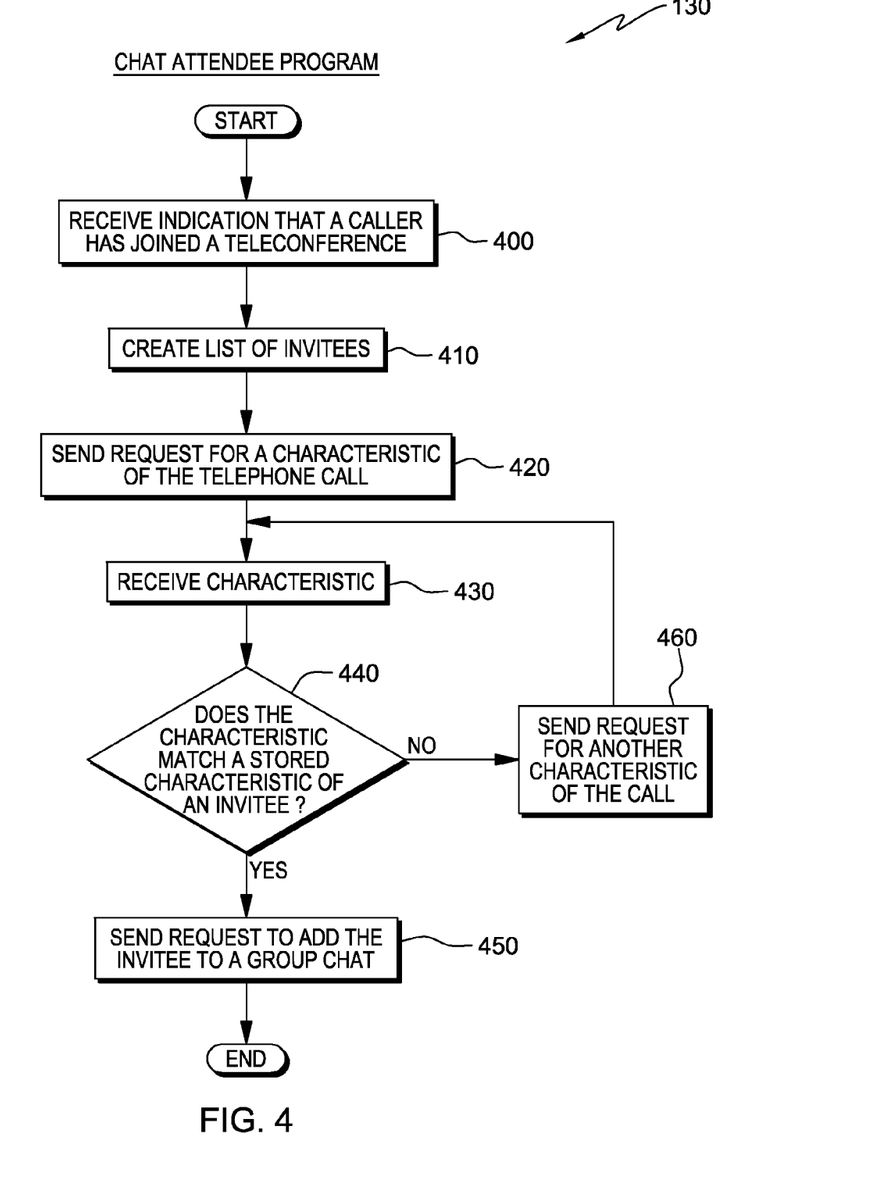
FIG. 4 depicts a flowchart of the steps of a chat attendee program executing within the computing system of FIG. 1, for adding a caller who has joined a teleconference via a telephone call to a group instant messaging chat, in accordance with one embodiment of the present invention.

FIG. 4 depicts a flowchart of the steps of chat attendee program 130 executing within the computing system of FIG. 1, for adding a caller who has joined a teleconference via a telephone call to a group instant messaging chat, in accordance with one embodiment of the present invention.

In one embodiment, initially, a user at client computer 40 composes an invitation to a teleconference, including entry of at least one invitee to the teleconference other than the user, using calendaring client program 150. Calendaring client program 150 sends the invitation to calendaring client program 170, which is a calendaring client program associated with an invitee, via calendaring server program 110. Calendaring server program 110 stores the invitation in calendar event storage 115.

At the scheduled date and time for the teleconference, the invitee associated with calendaring client program 170 (which received the invitation from calendaring client program 150) calls the telephone number of a teleconferencing service listed in the invitation from telephone 70. In one embodiment, telephone communication between telephones 60 and 70 occurs over network 20 when the invitees use telephones 60 and 70 to dial the telephone number of the teleconference service and are connected to teleconferencing server program 100.

In step 400, chat attendee program 130 receives a notification from teleconferencing server program 100 that a caller has joined the teleconference via a telephone call from telephone 70. In one embodiment, teleconferencing server program 100 may determine the teleconference that the caller has joined by comparing the participant code (i.e., unique number) entered by the caller when calling in to the teleconferencing service to participant codes included in one or more teleconference invitations stored by calendaring server program 110 in calendar event storage 115.

In response to receiving the notification, chat attendee program 130 creates a list of invitees to the determined teleconference (step 410). In one embodiment, chat attendee program 130 fetches an invitation to the determined teleconference stored by calendaring server program 110 in calendar event storage 115. Chat attendee program 130 searches the fetched invitation for invitees listed in the fields of the fetched invitation designated for invitees, such as fields 214 and 216 shown in FIG. 2, and adds all invitees found during the search to the list.

In step 420, chat attendee program 130 sends a request to teleconferencing server program 100 for a characteristic of the telephone call made by the caller from telephone 70. In one embodiment, the characteristic of the telephone call is the telephone number of telephone 70. Teleconferencing server program 100 may obtain the telephone number of telephone 70 from caller ID data received from telephone 70 over network 20. Teleconferencing server program 100 may forward the obtained telephone number of telephone 70 to chat attendee program 130 in response to receiving the request for the characteristic of the telephone call.

In another embodiment, the characteristic of the telephone call is the name of the caller. Generally, a caller is asked to speak his or her name when he or she joins a teleconference. Teleconferencing server program 100 may receive the spoken audio of the name of the caller from telephone 70 over network 20 and convert the spoken audio to text using a speech recognition function that is a part of teleconferencing server program 100 or is a separate program accessible to teleconferencing server program 100. Teleconferencing server program 100 may then forward the name of the caller in the form of text to chat attendee program 130 in response to receiving the request for the characteristic of the telephone call. Alternatively, teleconferencing server program 100 may forward the spoken audio directly to chat attendee program 130 as a characteristic of the telephone call. In another embodiment, the name of the caller may also be obtained from caller ID data received from telephone 70 over network 20.

Chat attendee program 130 receives the characteristic of the telephone call made by the caller from telephone 70 (step 430). Chat attendee program 130 determines whether the received characteristic of the telephone call matches a stored characteristic of an invitee to the teleconference (decision 440). In one embodiment, chat attendee program 130 fetches, from characteristic storage 140, stored characteristics of the invitees on the list of invitees to the teleconference created in step 410. Chat attendee program 130 compares the received characteristic of the telephone call to the stored characteristics of the invitees on the list of invitees. The stored characteristics of the invitees on the list of invitees may be included in profiles of the invitees on the list of invitees.

In one example, if the received characteristic of the telephone call is the telephone number of telephone 70, chat attendee program 130 compares the telephone number of telephone 70 to telephone numbers in the profiles of the invitees on the list of invitees. In another example, if the received characteristic of the telephone call is the name of the caller, chat attendee program 130 compares spoken audio of the name of the caller received from teleconferencing server program 100 to stored samples of spoken audio (voice prints) in the profiles of the invitees on the list of invitees using a speaker recognition function that is part of chat attendee program 130 or is a separate program accessible to chat attendee program 130. In one embodiment, the speaker recognition function can be embodied in known speaker recognition software, such as IBM® WebSphere® Voice Server, that determines who is speaking by comparing voice prints, instead of converting the spoken audio to text. The term "voice print" refers to data derived from processing speech, where the derived data may be considered indicative of characteristics of the vocal tract of the speaker.

If chat attendee program 130 determines that the received characteristic of the telephone call matches a stored characteristic of an invitee to the teleconference, (decision 440, yes branch), chat attendee program 130 identifies the caller as an invitee to the teleconference and requests that instant messaging server program 120 add the caller to a group instant messaging chat (step 450). In one embodiment, chat attendee program 130 requests instant messaging server program to create the group instant messaging chat if the group instant messaging chat has not been created prior to adding the caller to the group instant messaging chat. In one embodiment, chat attendee program 130 fetches an instant messaging ID of the invitee. Chat attendee program 130 may fetch the instant messaging ID of the invitee from characteristic storage 140 or from a profile of the invitee fetched from characteristic storage 140. Chat attendee program 130 then requests that instant messaging server program 120 add the invitee to the group instant messaging chat by requesting that instant messaging server program 120 add the instant messaging ID of the invitee to the group instant messaging chat.

The invitee is logged in to instant messaging client program 180 using the instant messaging ID of the invitee at the time the invitee is added to the instant messaging group chat. Instant messaging server program 120 is communicatively connected to instant messaging client program 180 and knows that the instant messaging ID of the invitee is logged in to instant messaging client program 180, and therefore instant messaging server 120 is able to send group chat messages to instant messaging client program 180.

If chat attendee program 130 determines that the received characteristic of the telephone call does not match a stored characteristic of an invitee to the teleconference, (decision 440, no branch), in one embodiment, chat attendee program 130 sends a request to teleconferencing server program 100 for another characteristic of the telephone call (step 460) and returns to step 430. This cycle can continue until a match is made at step 440 or there are no other characteristics of the telephone call to receive.

In another embodiment, if chat attendee program 130 determines that the received characteristic of the telephone call does not match a stored characteristic of an invitee to the teleconference, (decision 440, no branch), chat attendee program 130 determines whether the received characteristic of the telephone call matches a stored characteristic in any profile stored in characteristic storage 140. In one embodiment, chat attendee program 130 fetches, from characteristic storage 140, stored characteristics in all profiles stored in characteristic storage 140. In one example, if chat attendee program 130 determines that the received characteristic of the telephone call matches a stored characteristic of any profile stored in characteristic storage 140, chat attendee program 130 identifies the caller as an invitee to the teleconference and requests that instant messaging server program 120 add the caller to a group instant messaging chat. In another example, if chat attendee program 130 determines that the received characteristic of the telephone call matches a stored characteristic of any profile stored in characteristic storage 140, chat attendee program 130 may prompt a caller who was previously added to the group instant messaging chat as to whether to add the caller to the group instant messaging chat.

In another embodiment, chat attendee program 130 may determine that the received characteristic of the telephone call partially matches a stored characteristic of one or more invitees to the teleconference at decision 440. For example, if the received characteristic of the telephone call is the telephone number of telephone 70, chat attendee program 130 may match only the area code of the telephone number of telephone 70 with the area code of telephone numbers in the profiles of the invitees on the list of invitees. If the partial match is to the area code of only one telephone number in the profiles of the invitees on the list of invitees, chat attendee program 130 may identify the caller as an invitee to the teleconference and request that instant messaging server program 120 add the caller to a group instant messaging chat (step 450 described above). However, if the partial match is to the area code of more than one telephone number in the profiles of the invitees on the list of invitees, chat attendee program 130 may send a request to teleconferencing server program 100 for another characteristic of the telephone call (step 460 described above).

In another example, if the received characteristic of the telephone call is the name of the caller, chat attendee program 130 may match only the given name or a nickname of the caller with given names or nicknames in the profiles of the invitees on the list of invitees. If the partial match is to the given name of only one given name in the profiles of the invitees on the list of invitees, chat attendee program 130 may identify the caller as an invitee to the teleconference and request that instant messaging server program 120 add the caller to a group instant messaging chat (step 450 described above). However, if the partial match is to the given name of more than one given name in the profiles of the invitees on the list of invitees, chat attendee program 130 may send a request to teleconferencing server program 100 for another characteristic of the telephone call (step 460 described above).

In one embodiment, if chat attendee program 130 sends a request to teleconferencing server program 100 for another characteristic of the telephone call (step 460) and chat attendee program 130 receives a notification from teleconferencing server 100 that there are no other characteristics of the telephone call to be sent, then chat attendee program 130 may send a notification to teleconferencing server program 100 to prompt the caller to provide additional characteristics. In one embodiment, teleconferencing server program 100 may send an audio message to telephone 70 over network 20 to prompt the caller to provide an additional characteristic. For example, the prompt may ask the caller to speak the caller's last (family) name if it was not already provided by the caller. In another embodiment, teleconferencing server program 100 may announce to the caller an audible list of invitees and a unique number assigned to each invitee in the list. Teleconferencing program 100 will then prompt the caller to input the unique number that corresponds to the caller's name into the telephone.

In another embodiment, if chat attendee program 130 sends a request to teleconferencing server program 100 for another characteristic of the telephone call (step 460), and chat attendee program 130 receives a notification from teleconferencing server program 100 that there are no other characteristics of the telephone call to be sent, then chat attendee program 130 may prompt a caller who was previously added to the group instant messaging chat as to whether to add the caller to the group instant messaging chat. In one embodiment, chat attendee program 130 may send a prompt to the instant messaging client program of the previously added caller over network 20. The prompt may be in the form of a pop up window that contains the characteristics of the telephone call of the caller.

Figure 5:
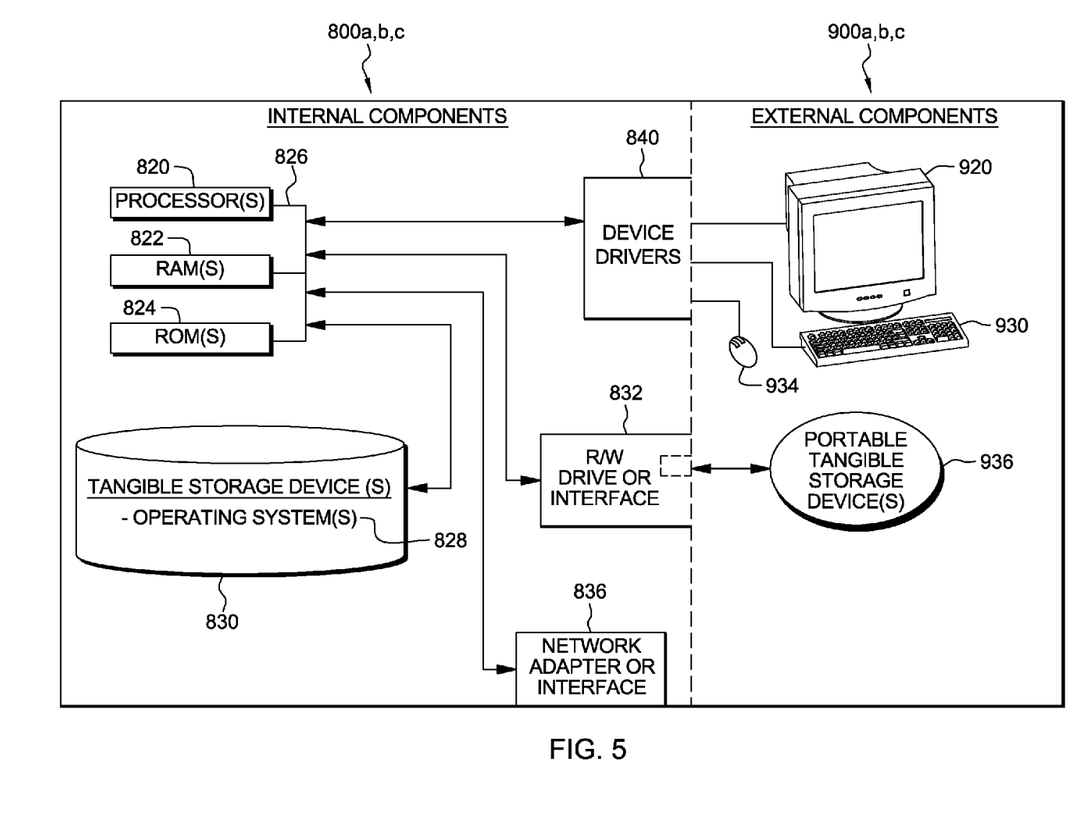
FIG. 5 is a block diagram of internal and external components of the server computer and the client computers of FIG. 1 in accordance with one embodiment of the present invention.

FIG. 5 is a block diagram of internal and external components of server computer 30 and client computers 40 and 50 in accordance with one embodiment of the present invention.

Server computer 30 and client computers 40 and 50 include respective sets of internal components 800*a,b,c* and external components 900*a,b,c*. Each of the sets of internal components 800*a,b,c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, teleconferencing server program 100, calendaring server program 110, instant messaging server program 120, chat attendee program 130, characteristic storage 140, and calendar event storage 115 are stored on at least one of one or more of computer-readable tangible storage devices 830 of internal components 800*a* for execution by at least one of one or more of processors 820 of internal components 800*a* via at least one of one or more of RAMs 822 of internal components 800*a* (which typically include cache memory). The one or more operating systems 828, calendaring client program 150, and instant messaging client program 160 are stored on at least one of one or more of computer-readable tangible storage devices 830 of internal components 800*b* for execution by at least one of one or more of processors 820 of internal components 800*b* via at least one of one or more of RAMs 822 of internal components 800*b* (which typically include cache memory). The one or more operating systems 828, calendaring client program 170, and instant messaging client program 180 are stored on at least one of one or more of computer-readable tangible storage devices 830 of internal components 800*c* for execution by at least one of one or more of processors 820 of internal components 800*c* via at least one of one or more of RAMs 822 of internal components 800*c* (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Teleconferencing server program 100, calendaring server program 110, instant messaging server program 120, chat attendee program 130, characteristic storage 140, and calendar event storage 115 can be stored on at least one of one or more of portable computer-readable tangible storage devices 936 of external components 900a, read via R/W drive or interface 832 of internal components 800a and loaded into at least one of computer-readable tangible storage devices 830 of internal components 800a. Calendaring client program 150 and instant messaging client program 160 can be stored on at least one of one or more of portable computer-readable tangible storage devices 936 of external components 900b, read via R/W drive or interface 832 of internal components 800b and loaded into at least one of computer-readable tangible storage devices 830 of internal components 800b. Calendaring client program 170 and instant messaging client program 180 can be stored on at least one of one or more of portable computer-readable tangible storage devices 936 of external components 900c, read via R/W drive or interface 832 of internal components 800c and loaded into at least one of computer-readable tangible storage devices 830 of internal components 800c.

Each set of internal components 800a,b,c also includes a network adapter or interface 836 such as a TCP/IP adapter card. Teleconferencing server program 100, calendaring server program 110, instant messaging server program 120, chat attendee program 130, characteristic storage 140, and calendar event storage 115 can be downloaded to server computer 30 from an external computer via a network (such as network 20) and network adapter or interface 836 of internal components 800a. From the network adapter or interface 836 of internal components 800a, teleconferencing server program 100, calendaring server program 110, instant messaging server program 120, chat attendee program 130, characteristic storage 140, and calendar event storage 115 are loaded into at least one of computer-readable tangible storage devices 830 of internal components 800a. Calendaring client program 150 and instant messaging client program 160 can be downloaded to client computer 40 from an external computer via a network (such as network 20) and network adapter or interface 836 of internal components 800b. From the network adapter or interface 836 of internal components 800b, calendaring client programs 150 and instant messaging client program 160 are loaded into at least one of computer-readable tangible storage devices 830 of internal components 800b. Calendaring client programs 170 and instant messaging client programs 180 can be downloaded to client computer 50 from an external computer via a network (such as network 20) and network adapter or interface 836 of internal components 800c. From the network adapter or interface 836 of internal components 800c, calendaring client programs 170 and instant messaging client programs 180 are loaded into computer-readable tangible storage devices 830 of internal components 800c. The network may comprise copper wires, optical fibers, wireless transmission, routers, firewalls, switches, gateway computers and/or edge servers.

Each of the sets of external components 900 a,b,c can include a computer display monitor 920, a keyboard 930, and a computer mouse 934. External components 900 a,b,c can also include touch screens, virtual keyboards, touch pads, pointing devices, and other human interface devices. Each of the sets of internal components 800 a,b,c also includes device drivers 840 to interface to computer display monitor 920, keyboard 930 and computer mouse 934. Device drivers 840, R/W drive or interface 832 and network adapter or interface 836 comprise hardware and software (stored in storage device 830 and/or ROM 824).

Teleconferencing server program 100, calendaring server program 110, instant messaging server program 120, chat attendee program 130, characteristic storage 140, calendar event storage 115, calendaring client program 150, instant messaging client program 160, calendaring client program 170, and instant messaging client program 180 can be written in various programming languages (such as Java, C++) including low-level, high-level, object-oriented or non object-oriented languages. Alternatively, the functions of teleconferencing server program 100, calendaring server program 110, instant messaging server program 120, chat attendee program 130, characteristic storage 140, calendar event storage 115, calendaring client program 150, instant messaging client program 160, calendaring client program 170, and instant messaging client program 180 can be implemented in whole or in part by computer circuits and other hardware (not shown).

Based on the foregoing, a computer system, a method and a program product have been disclosed for adding a caller, who has joined a teleconference via a telephone call, to a group instant messaging chat if the caller is identified as an invitee to the teleconference. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for adding a caller to a group instant messaging chat, the method comprising the steps of:
   a computer receiving an indication that the caller has joined a teleconference via a telephone call;
   the computer receiving a characteristic of the telephone call; and
   the computer determining that the received characteristic of the telephone call at least partially matches at least one stored characteristic of one or more invitees on a list of invitees to the teleconference, and in response, the computer requesting an instant messaging server to add the caller to the group instant messaging chat.

2. The method of claim 1, wherein the characteristic comprises a telephone number from which the telephone call originated.

3. The method of claim 1, wherein the characteristic comprises text of a name of the caller.

4. The method of claim 1, wherein the characteristic comprises a voice print of a name of the caller spoken over the telephone call.

5. The method of claim 1, wherein the at least one stored characteristic of the one or more invitees on a list of invitees to the teleconference comprises a first stored characteristic of a first invitee and a first stored characteristic of a second invitee, wherein the step of the computer determining that the received characteristic of the telephone call at least partially matches the at least one stored characteristic of the one or more invitees on a list of invitees to the teleconference comprises the computer determining that the characteristic of the telephone call at least partially matches the first stored characteristic of the first invitee and the first stored characteristic of the second invitee, and wherein the step of the computer requesting the instant messaging server to add the caller to the group instant messaging chat is further in response to the computer receiving a second characteristic of the telephone call and the computer determining that the received second characteristic of the telephone call at least partially matches a second stored characteristic of the first invitee.

6. The method of claim 1, further comprising the steps of:
the computer receiving an indication that a second caller has joined a teleconference via a second telephone call;
the computer receiving a characteristic of the second telephone call; and
the computer determining that the received characteristic of the second telephone call does not at least partially match the at least one stored characteristic of the one or more invitees on a list of invitees to the teleconference, and in response, the computer sending a request for a second characteristic of the second telephone call.

7. The method of claim 6, further comprising the steps of:
the computer receiving the second characteristic of the second telephone call; and
the computer determining that the received second characteristic of the second call does not at least partially match the at least one stored characteristic of the one or more invitees on a list of invitees to the teleconference, and in response, the computer prompting the caller as to whether to add the second caller to the group instant messaging chat.

8. A computer program product for adding a caller to a group instant messaging chat, the computer program product comprising:
one or more computer-readable tangible storage devices and program instructions stored on at least one of the one or more storage devices, the program instructions comprising:
program instructions to receive an indication that the caller has joined a teleconference via a telephone call;
program instructions to receive a characteristic of the telephone call; and
program instructions to determine that the received characteristic of the telephone call at least partially matches at least one stored characteristic of one or more invitees on a list of invitees to the teleconference, and in response, to request an instant messaging server to add the caller to the group instant messaging chat.

9. The computer program product of claim 8 wherein the characteristic comprises a telephone number from which the telephone call originated.

10. The computer program product of claim 8, wherein the characteristic comprises text of a name of the caller.

11. The computer program product of claim 8, wherein the characteristic comprises a voice print of a name of the caller spoken over the telephone call.

12. The computer program product of claim 8, wherein the at least one stored characteristic of the one or more invitees on a list of invitees to the teleconference comprises a first stored characteristic of a first invitee and a first stored characteristic of a second invitee, wherein the program instructions to determine that the received characteristic of the telephone call at least partially matches the at least one stored characteristic of the one or more invitees on a list of invitees to the teleconference comprise program instructions to determine that the characteristic of the telephone call at least partially matches the first stored characteristic of the first invitee and the first stored characteristic of the second invitee, and wherein the program instructions to request the instant messaging server to add the caller to the group instant messaging chat are further responsive to receiving a second characteristic of the telephone call and to determining that the received second characteristic of the telephone call at least partially matches a second stored characteristic of the first invitee.

13. The computer program product of claim 8, further comprising:
program instructions, stored on at least one of the one or more storage devices, to receive an indication that a second caller has joined a teleconference via a second telephone call;
program instructions, stored on at least one of the one or more storage devices, to receive a characteristic of the second telephone call; and
program instructions, stored on at least one of the one or more storage devices, to determine that the received characteristic of the second telephone call does not at least partially match the at least one stored characteristic of the one or more invitees on a list of invitees to the teleconference; and in response, to send a request for a second characteristic of the second telephone call.

14. The computer program product of claim 8, further comprising:
program instructions, stored on at least one of the one or more storage devices, to receive the second characteristic of the second telephone call; and
program instructions, stored on at least one of the one or more storage devices, to determine that the received second characteristic of the second telephone call does not at least partially match the at least one stored characteristic of the one or more invitees on a list of invitees to the teleconference, and in response, to prompt the caller as to whether to add the second caller to the group instant messaging chat.

15. A computer system for adding a caller to a group instant messaging chat, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive an indication that the caller has joined a teleconference via a telephone call;
program instructions to receive a characteristic of the telephone call; and
program instructions to determine that the received characteristic of the telephone call at least partially matches at least one stored characteristic of one or more invitees on a list of invitees to the teleconference, and in response to request an instant messaging server to add the caller to the group instant messaging chat.

16. The computer system of claim 15, wherein the characteristic comprises a telephone number from which the telephone call originated.

17. The computer system of claim 15, wherein the characteristic comprises text of a name of the caller.

18. The computer system of claim 15, wherein the characteristic comprises a voice print of a name of the caller spoken over the telephone call.

19. The computer system of claim 15, wherein the at least one stored characteristic of the one or more invitees on a list of invitees to the teleconference comprises a first stored characteristic of a first invitee and a first stored characteristic of a second invitee, wherein the program instructions to determine that the received characteristic of the telephone call at least partially matches the at least one stored characteristic of the one or more invitees on a list of invitees to the teleconference comprise program instructions to determine that the characteristic of the telephone call at least partially matches the first stored characteristic of the first invitee and the first stored characteristic of the second invitee, and wherein the program instructions to request the instant messaging server to add the caller to the group instant messaging chat are further responsive to receiving a second characteristic of the telephone call and determining that the received second characteristic of the telephone call at least partially matches a second stored characteristic of the first invitee.

20. The computer system of claim 15, further comprising:
program instructions, stored on at least one of the one or more storage devices for execution by at least one of the one or more processors via at least one of the one or more memories, to receive an indication that a second caller has joined a teleconference via a second telephone call;
program instructions, stored on at least one of the one or more storage devices for execution by at least one of the one or more processors via at least one of the one or more memories, to receive a characteristic of the second telephone call; and
program instructions, stored on at least one of the one or more storage devices for execution by at least one of the one or more processors via at least one of the one or more memories, to determine that the received characteristic of the second call does not at least partially match the at least one stored characteristic of the one or more invitees on a list of invitees to the teleconference, and in response, to send a request for a second characteristic of the second telephone call.

\* \* \* \* \*